United States Patent
Malmin

(10) Patent No.: US 9,633,423 B2
(45) Date of Patent: Apr. 25, 2017

(54) METHOD OF REDUCTION OF SEPTAL SHADOWS FOR THICK SEPTA COLLIMATORS

(71) Applicant: Siemens Medical Solutions USA, Inc., Malvern, PA (US)

(72) Inventor: Ronald E. Malmin, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/735,270

(22) Filed: Jun. 10, 2015

(65) Prior Publication Data

US 2015/0363923 A1 Dec. 17, 2015

Related U.S. Application Data

(60) Provisional application No. 62/011,289, filed on Jun. 12, 2014.

(51) Int. Cl.
| | |
|---|---|
| *G01T 1/16* | (2006.01) |
| *G06T 5/50* | (2006.01) |
| *G01T 1/164* | (2006.01) |
| *G06T 5/00* | (2006.01) |

(52) U.S. Cl.
CPC ............. *G06T 5/50* (2013.01); *G01T 1/1647* (2013.01); *G06T 5/003* (2013.01); *G06T 2207/10108* (2013.01); *G06T 2207/20221* (2013.01)

(58) Field of Classification Search
CPC . G06T 5/50; G06T 5/003; G06T 2207/10108; G06T 2207/20221; G01T 1/1647
See application file for complete search history.

(56) References Cited

U.S. PATENT DOCUMENTS

| | | | | |
|---|---|---|---|---|
| 6,130,430 A | * | 10/2000 | DiFilippo | G01T 1/1648 250/363.03 |
| 6,271,524 B1 | * | 8/2001 | Wainer | G21K 1/02 250/363.03 |
| 2007/0217666 A1 | * | 9/2007 | Gal | G01T 1/1642 382/131 |
| 2008/0078937 A1 | * | 4/2008 | Tsuchiya | G01T 1/2928 250/366 |
| 2012/0177268 A1 | | 7/2012 | Malmin | |

* cited by examiner

*Primary Examiner* — Yara B Green

(57) ABSTRACT

Disclosed herein is a method for removing septal shadows from thick septa collimator images, comprising disposing a line radiation source in a first orientation with respect to an imaging detector; disposing a thick septa collimator between the line radiation source and the imaging detector; where the collimator and the detector move in unison with one another; obtaining a plurality of a line images, where each line image is taken at a different location of the line radiation source with respect to the thick septa collimator; wherein each different location of the line radiation source is along a first linear direction; and relocating the plurality of the line images so obtained to a common location; and summing the images to reduce the septal shadow effects.

12 Claims, 3 Drawing Sheets

METHOD OF REDUCTION OF SEPTAL SHADOWS FOR THICK SEPTA COLLIMATORS

CROSS-REFERENCE TO RELATED APPLICATIONS

This disclosure claims the benefit of U.S. Provisional Application No. 62/011,289, filed on Jun. 12, 2014, the entire contents of which are hereby incorporated by reference.

BACKGROUND

This disclosure relates to a method of reducing shadows when thick septa collimators are used for X- and gamma-ray imaging. In particular, it relates to a method of reducing shadows (obtained when thick septa collimators are used for imaging) via synthetic collywobbling.

Nuclear medicine is a unique medical specialty wherein radiation is used to acquire images that show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions that emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

Single photon imaging, either planar or SPECT, relies on the use of a collimator placed between the source and a scintillation crystal or solid state detector, to allow only gamma rays aligned with the holes of the collimator to pass through to the detector, thus constraining the line on which the gamma emission is able to occur.

Two principal types of multi-hole collimators have been used in nuclear medical imaging. One includes parallel-hole collimators while the other includes focusing collimators such as fan collimators, cone collimators, variable-focus collimators, and the like. The predominant type of collimator is the parallel-hole collimator. Both types of collimator contain thousands of holes formed into a very dense material such as lead. The holes of an ideal parallel-hole collimator all point perpendicular to the collimator surface and accept only photons traveling in that direction. It produces a planar image of the same size as the source object. The hole directions of an ideal focusing collimator are inclined relative to the collimator surface normal in a regular, mathematically well-defined manner; e.g., the holes of an ideal fan beam collimator all point to a line; the holes of an ideal cone beam collimator focus to a point. Focusing collimators magnify or minify the image depending on whether the holes converge or diverge.

Tomographic reconstruction requires accurate knowledge of these hole directions in order to infer the line of response from which the acquired projection data emanated. However, problems in construction and manufacture of real collimators can cause their hole directions to differ from the ideal. This degrades the quality of tomographic images because the projection and backprojection processes involved in tomographic reconstruction take place along distorted lines of response. As a remedy to this problem, nuclear vector maps are used to measure the actual direction of the holes so that tomographic reconstruction can take place along the true, rather than idealized, lines of response of the collimator. This improves the quality and accuracy of the resulting tomographic images.

Nuclear vector maps are measured by scanning a line source across the collimator field of view and measuring the location of the line at each scan point. The line location is defined by the center of the transverse profile through the line at each image location along the line. This location is then compared to a reference (calibrated) position of the line center. The hole angle is deduced from this geometry. This process is performed in two orthogonal dimension; e.g., the X, Y-dimensions of the imaging detector corresponding to scans using vertically and horizontally oriented line sources.

The walls surrounding and defining the collimator holes (septa) are designed to be sufficiently thick to absorb photons not traveling in the desired direction. For low energy isotopes such as Tc99 the septa are thin and produce no visible effects in the line images. At higher energies, however, the septal thickness must be increased to absorb the more penetrating photons. As the septal thickness increases, septal shadows are produced which distort images and produce artifacts. Septal artifacts distort the line images and their profiles.

These artifacts prevent an accurate determination of hole-direction angles, which in turn prevent obtaining accurate vector maps. It is therefore desirable to devise a method to reduce septal shadows so that hole orientation angles can be accurately computed if desired. Knowing hole orientation angles properly facilitates an accurate determination of vector maps and hence of the accuracy of tomographic imaging.

SUMMARY

Disclosed herein is a method for removing septal shadows from thick septa collimator images, comprising disposing a line radiation source in a first orientation with respect to an imaging detector; disposing a thick septa collimator between the line radiation source and the imaging detector; where the collimator moves in unison with the detector; obtaining a plurality of a line images, where each line image is taken at a different location of the line radiation source with respect to the thick septa collimator; wherein each different location of the line radiation source is along a first linear direction; and relocating the plurality of the line images so obtained to a common location; and summing the images to reduce the septal shadow effects.

Disclosed herein too is a system for removing septal shadows from a thick septa collimator, comprising a detector; a controllably movable stage; a line radiation source positioned at a distance from the detector, wherein the line radiation source is mounted on the controllably movable stage; a collimator positioned between the detector and the line radiation source; where the collimator moves in unison with the detector; a control unit for controlling the movable stage, said control unit comprising a machine-readable memory unit for storing a set of instructions for relocating a plurality of images to a common location and summing up the images; and a processor unit for executing the set of instructions, wherein when said processor executes said set of instructions, the control unit performs a method comprising disposing a line radiation source in a first orientation with respect to an imaging detector; disposing a thick septa collimator between the line radiation source and the imaging detector; obtaining a plurality of a line images, where each line image is taken at a different location of the line radiation source with respect to the thick septa collimator; wherein each different location of the line radiation source is along a first linear direction; and relocating the plurality of the line images so obtained to a common location; and summing the images to reduce the septal shadow effects.

DETAILED DESCRIPTION

Figure 1:
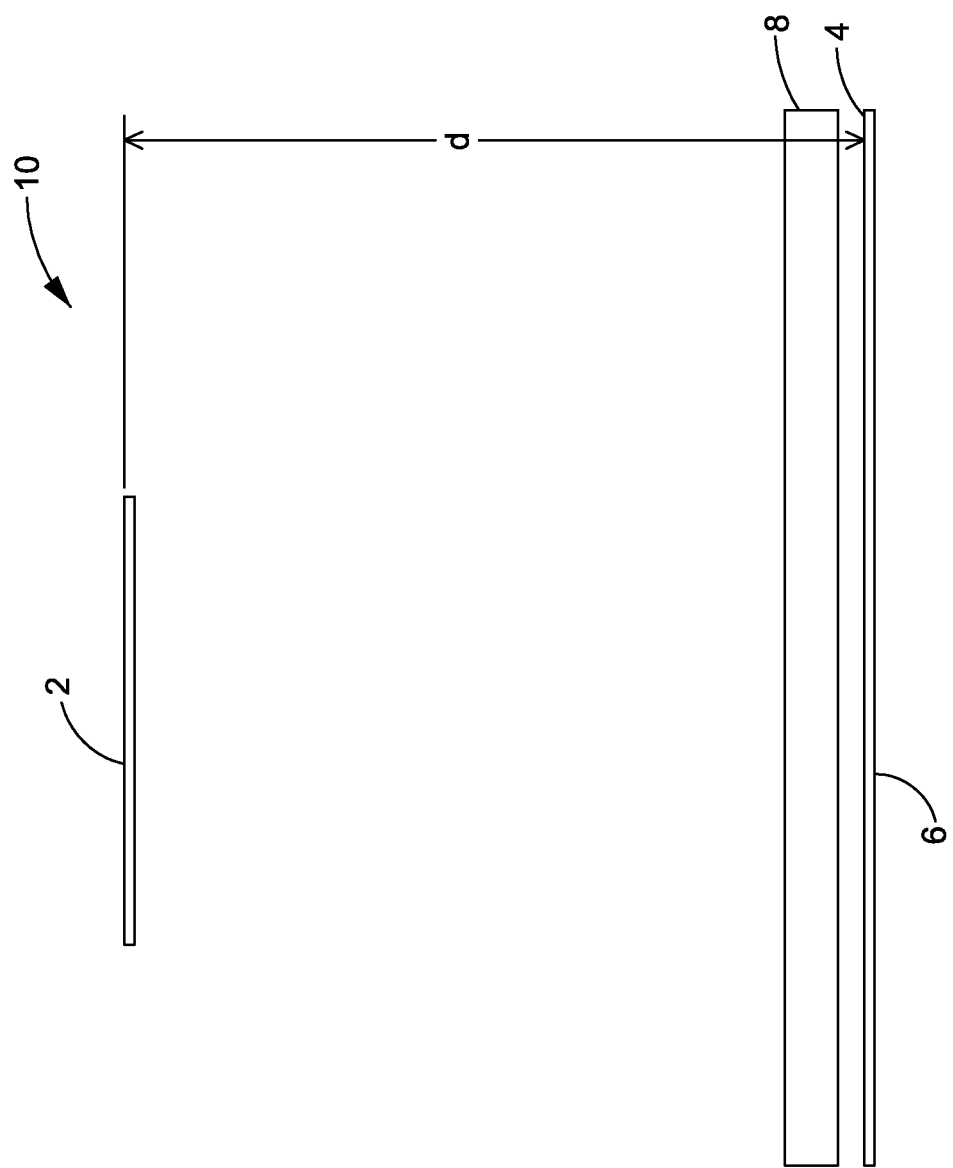
FIG. 1 shows a schematic representation of an arrangement for reducing septal shadows in thick septa collimators.

Disclosed herein is a method of reducing septal shadows for thick-septa (i.e., thick wall) collimators. The method can be used for both parallel and focusing (e.g., fan-beam, cone-beam) collimators. The method includes using line source images in a multistep imaging process to produce multiple images that can then be used to reduce septal shadows. These multiple images are then moved back to a common acquisition location and summed to yield an image with reduced septal pattern artifacts. The resulting images are smooth in the direction of the line profile, perpendicular to the line direction, to determine line locations. The sizes of the translations and shifts are selected so that septal shadows are made more uniform in the desired profile direction (horizontal or vertical).

True collywobbling involves the continual movement of the collimator, suspended between a fixed source of radiation and a fixed detector, within the plane of the collimator, thus averaging out the septal effects. In synthetic collywobbling, the collimator is fixed to the detector, and either or both the detector/collimator or the source of radiation are moveable. Synthetic collywobbling (SCW) is effected by translating and shifting the relative location of collimator and line source to sample the data more uniformly (through the holes of the collimator) while also shadowing the detector (by the septa) more uniformly. It is a sampling process, not a data smoothing process, because the mechanically shifted images are shifted back to a common acquisition location and summed. Hence the use of the term "synthetic". The process is advantageous in that it can be applied to medium energy and high energy collimators and facilitates the removal of septal pattern artifacts from images of horizontal and vertical line radiation sources.

This method permits the measurement and use of vector maps for all collimators, especially thick septa collimators. The nuclear vector map is used for determining collimator quality and for defining the lines of response in iterative reconstruction for collimators whose hole directions are poorly defined. It uses collimators with their support "skins" intact and fixed in a housing aligned to the detector coordinate system. It obviates the need for an optical vector map. The disclosed system and method improves the quality of reconstructed images by performing forward and/or back projections using a vector map of the hole directions at each point of the collimator surface. This approach can work for arbitrary collimation geometry and can automatically account for errors in the collimator "pointing vectors," thereby minimizing distortions and improving reconstructed image resolution.

The method comprises disposing a line source at a plurality of locations relative to a collimator that is fixed to a detector. This is referred to hereinafter as the "collimator/detector". During the irradiation of the collimator with the line source at a given orientation relative to the imaging axes of a medical imaging detector (see FIG. 1), either the collimator/detector or the line source is moved to a plurality of different positions where an image is collected at each position. These images are then shifted back to a common acquisition location and summed to facilitate an averaging out the septal effects. Post smoothing of the synthetic collywobbled shadow patterns may also be conducted if desired. Once the septal shadows are reduced or removed, hole orientation angles may be accurately calculated if desired.

In some embodiments, for a given orientation the line radiation source can be located at from 2 to 4 locations relative to the position of the collimator/detector. The optimum number, size, and direction of the translations/shifts depend on the size and shape of the collimator hole and on the septal thickness. During the irradiation of the collimator with the line source at a given orientation relative to the imaging axes of a medical imaging detector, either the collimator/detector or the line source is moved to at least 2 different positions in a given direction where an image is collected at each position. This procedure is repeated for a second orientation of the line source relative to the imaging axes of a medical imaging detector. The second orientation is orthogonal to the first orientation.

In an embodiment, with the line source in a first given orientation (i.e., inclined at a first angle to the axes of the medical imaging detector), 2 or more different images are taken with the collimator/detector or the line source moved to 2 or more different positions in a first linear direction. In other words, with the line source in a first given orientation, a first image is taken with the collimator/detector in a first position. The line source and/or the collimator/detector are then moved to a second position (while maintaining the same orientation angle for the line source) and a second image is taken. The second image is then moved back to the location of the first image and the two images are summed to average out the shadow effects produced by the thick septa of the collimator. The process can be repeated for a third or more times as needed to average out the septal artifacts in the direction of the lines cross sectional profile.

In a similar manner, the line source is then moved to a second given orientation (i.e., inclined at a second angle to the axes of the medical imaging detector) and another 2 or more different images are taken with the collimator or the line source moved to at least 2 or more different positions in a second direction that is different from the first direction. These two or more images are also moved back to a common location and summed up to average out the shadow effects of the thick septa.

In some embodiments, the line source is disposed in a horizontal orientation and 2 or more images of the line source are captured while moving the collimator/detector combination or the line source in a first direction. The line source is then disposed in a vertical orientation and 2 or more images of the line source are captured while moving the collimator/detector combination or the line source in a second direction that is perpendicular to the first direction. In an exemplary embodiment, the first direction and the second direction are mutually perpendicular to each other in a single plane. For example, the first direction can be in the x direction while the second direction can be in the y-direction (using traditional Cartesian coordinates) where the x-direction and the y-direction are mutually perpendicular to one another but where both are in a single plane.

FIG. 1 shows a schematic of an arrangement 10 for use obtaining a plurality of line radiation source images via a thick septa collimator 8. Referring to FIG. 1, a line radiation source 2 in its first orientation is positioned a known distance D above the interaction plane 4 of a medical imaging detector 6. A collimator 8, whose septal shadows are to be eliminated or minimized, e.g., a multi-focal length collimator, is positioned between the line radiation source 2 and the detector 6. The line radiation source 2 is configured and adapted to be controllably movable or scanned (as shown in the FIG. 2) in a direction parallel to the interaction plane 4 of the detector 6 so that the line radiation source 2 maintains its distance D above the detector's interaction plane 4.

FIG. 1 shows only one line radiation source 2 viewed from a side of the line radiation source 2 for purpose of simplifying the description. In practical application, however, for efficiency, a plurality of line radiation sources are used to minimize the time required to make the measurements. A device having a plurality of radiation sources and its method of use is detailed in U.S. Patent Publication No. 2012/0177268, the entire contents of which are hereby incorporated by reference.

Figure 2:
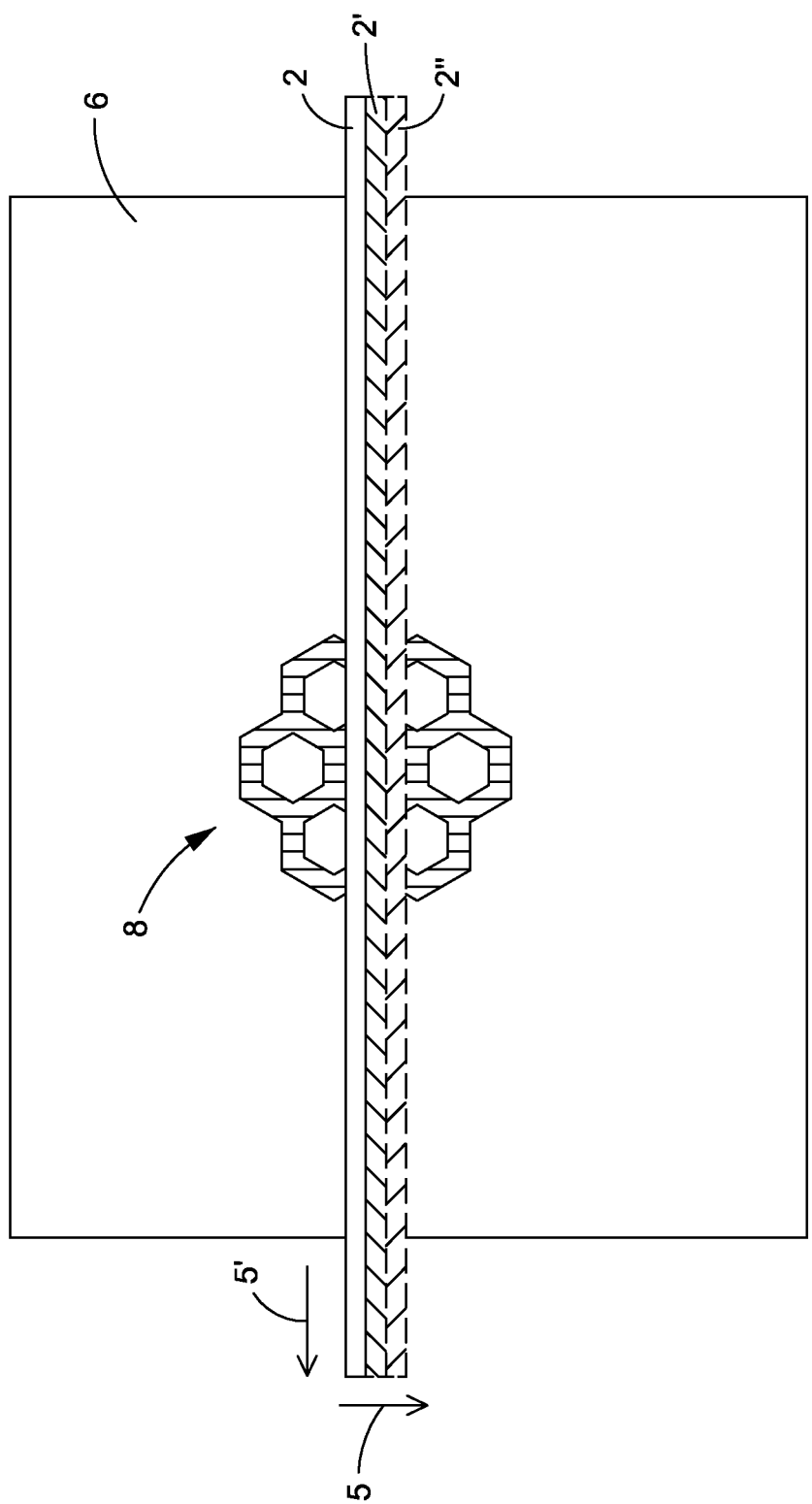
FIG. 2 is a schematic depiction of the shifted locations of a single line radiation source, relative to the collimator, whose images can then be summed to effect the collywobbling process.

FIG. 2 shows one method of using the device of the FIG. 1 to remove septal shadows for a thick septa collimator 8. The line radiation source 2 is located in its first orientation (e.g., the horizontal orientation—indicated by the numeral 2) and a first image the line radiation source is taken using the detector 6. The line radiation source 2 is then moved in the direction 5 towards position 2' and a second image is taken. The line radiation source 2 is then again moved in the direction 5 towards position 2" and a third image is taken. The images are then moved back to a common acquisition location (e.g., the location at which the first image was taken) and summed to yield an image with reduced septal pattern artifacts. More than 3 images can be taken with the line radiation source in its first orientation.

It is to be noted that in the FIG. 2, the movement of the line radiation source 2 in the direction 5 is termed "translation". The line radiation source can also be moved in a direction depicted by the reference numeral 5'. This motion is called "shifting" and can also be used to obtain the desired images to eliminate or to reduce septal shadows and other artifacts.

This scanning/stepping movement of the line radiation source 2 relative to the collimator 8/detector 6 assembly can be accomplished using an X-Y stage. Preferably an automated programmable X-Y stage would be used to enable the relative movement between the line radiation source 2 and the collimator 8/detector 6 assembly. It is advantageous to choose movements that are monotonic (varying in such a way that it either never decreases or never increases) to prevent any overshooting (also termed backlash). In other words, it is desirable to move either the line radiation source or the collimator systematically by a fixed amount in one direction during the measurements.

Each of the line images obtained by the detector 6 is stored in a suitable storage medium provided in the controller system, preferably the system that is carrying out the scanning. The plurality of images obtained at the various line or collimator/detector positions are then moved back to a single acquisition location and summed up to yield an image with reduced septal pattern artifacts.

In another embodiment, the line radiation source 2 is then moved to a new orientation (a second orientation) that it is perpendicular to its first orientation. In this new orientation, the line source 2 or the collimator/detector combination may be imaged. The line source 2 or the collimator/detector combination may be moved 1 or more times to obtain 1 or more images (with one image being taken at each location). The plurality of images obtained at the various line or collimator/detector positions are then moved back to a single acquisition location and summed up to yield an image with reduced septal pattern artifacts.

In an embodiment, left-right movements (movements, for example, in the x-direction) can be produced by a linear drive (LD) while in-out movements (movements, for example, in the y-direction) can be produced by the bed. In order to avoid mechanical backlash in the linear drive and bed drive systems it is advantageous to choose shifts that are monotonic in direction. Significant artifact reduction is desirable only for the horizontal and vertical line sources orientations involved in vector mapping acquisitions, so independent shift size and direction can be chosen for horizontal and vertical line acquisitions.

Figure 3:
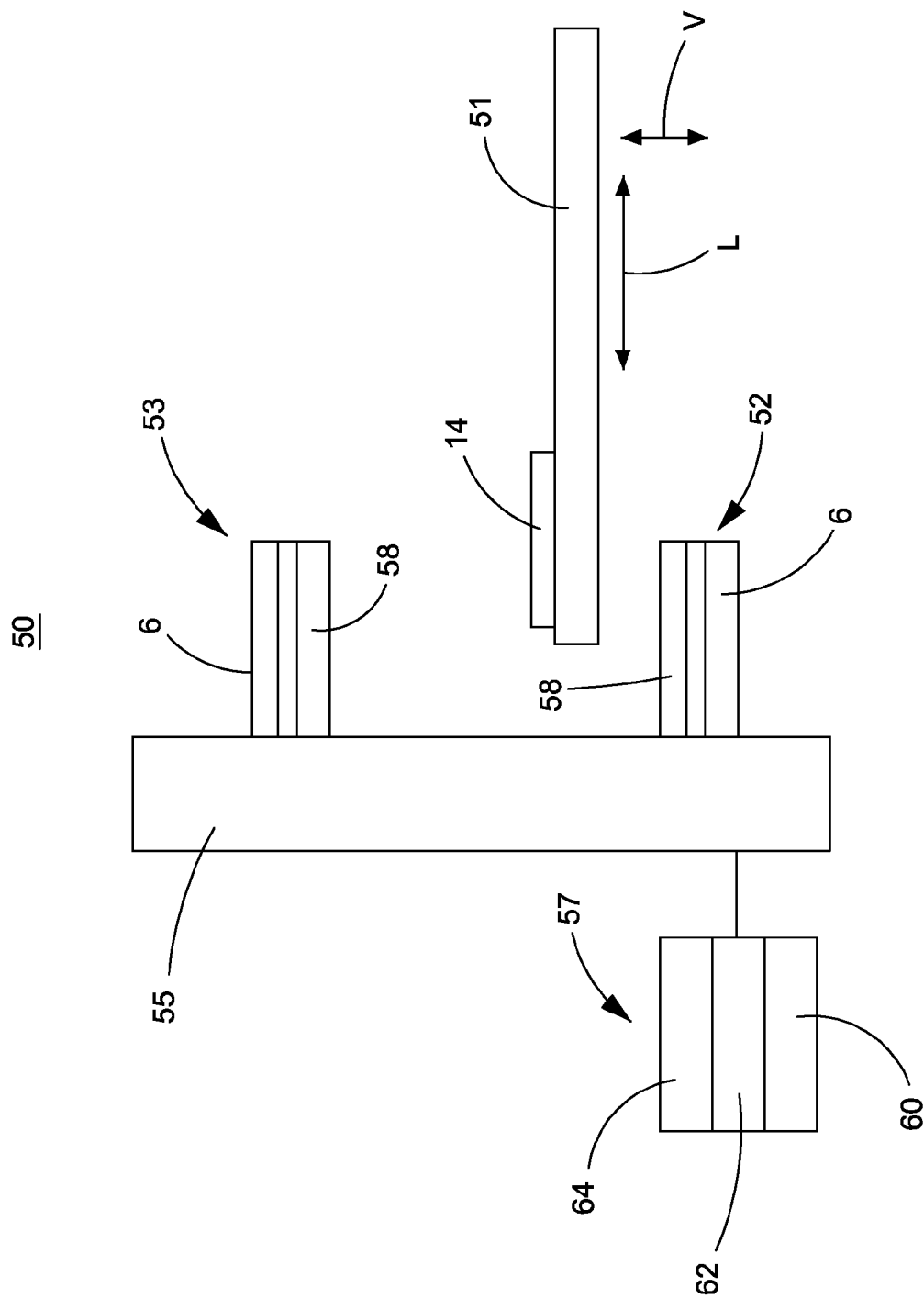
FIG. 3 is a schematic illustration of a system that permits collywobbling to reduce septall shadows.

The FIG. 3 is an example of a system 50 that can be utilized to implement the arrangement 10 of the FIG. 1. In this example, the system 50 is a SPECT system comprising at least a patient bed 51, detector units 52, 53, a gantry 55 providing support for the detector units 52, 53 and a control unit 57. The patient bed 51 is configured and adapted to be controllably movable in axial directions L, as well as vertical direction V. The patient bed 51 is used to hold the patient during the normal operation of the SPECT system, and, in this embodiment, the SPECT system 50 is utilized for the method described herein and the patient bed 51 is further utilized as the movable stage on which the carrier 14, capable of holding an assemblage of multiple parallel line sources, is mounted for performing the scanning/stepping procedure. The axial movement of the patient bed 51 in the direction L includes the directions along the y axes in the collimator's x-y coordinate plane. The scanning/stepping procedures in the x and y orientations described above can be achieved by rotating the carrier 14 by 90° on the patient bed 51. The distance D is controlled by the patient bed's movement in the vertical direction V and detector head 53 radius. The detector unit 53 generally comprises a collimator 58 fixed to a detector 6. The operation of the system 50 and the movement of the patient bed and the detector unit 53 are controlled by the control unit 57. The control unit 57 is provided with appropriate processor units 60, machine-readable memory units 62, and user interface units 64 for proper functioning of the system 50.

In an embodiment, the hole angle may be accurately determined (after removing the septal shadows) by measuring the angle subtended at the line source between the lines of response of the collimator of interest and the reference. The tangent of angle is directly proportional to the ratio of the difference in measured and reference line locations divided by the distance between the line source and the interaction-plane distance, D.

Accuracy of the system can be increased by an iterative process whereby the pixel location in the direction orthogonal to the focusing direction is re-computed using the map of the orthogonal direction angles. Details of such second order processes will vary with type of focusing collimation, but are obvious to those skilled in the art.

The method for operating the disclosed arrangement, as described herein, may be automated by, for example, tangibly embodying a program of instructions upon a machine-readable storage media, such as the machine-readable storage unit 62 of the SPECT system 50, capable of being read by a machine, such as the processor unit 60, capable of executing the instructions. A general purpose computer and/or computer processor is one example of such a machine. A non-limiting exemplary list of appropriate storage media well known in the art would include such devices as a readable or writeable CD, flash memory chips (e.g., thumb drives), various magnetic storage media, and the like.

The disclosed method is advantageous in that can be applied to medium energy and high energy collimators and facilitates the removal of septal pattern artifacts from images of horizontal and vertical line sources.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, singular forms like "a," or "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The features of the system and method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps disclosed herein may be performed automatically or wholly or partially in response to user command. An activity (including a step) performed automatically is performed in response to executable instruction or device operation without user direct initiation of the activity.

The disclosed systems and processes are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of the disclosed system. Further, any of the functions and steps provided in this disclosure may be implemented in hardware, software or a combination of both and may reside on one or more processing devices located at any location of a network linking the elements the disclosed system or another linked network, including the Internet.

The term "and/or" is used herein to mean both "and" as well as "or". For example, "A and/or B" is construed to mean A, B, or A and B.

The transition term "comprising" is inclusive of the transition terms "consisting essentially of" and "consisting of" and can be interchanged for "comprising".

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A method for removing septal shadows from septa collimator images, comprising:
   disposing a line radiation source in a first orientation with respect to an imaging detector;
   disposing a septa collimator between the line radiation source and the imaging detector; where the collimator moves in unison with the detector;
   obtaining a plurality of a line images, where each line image is taken at a different location of the line radiation source with respect to the septa collimator;

wherein each different location of the line radiation source is along a first linear direction;

relocating the plurality of the line images so obtained to a common location; and summing the images to reduce the septal shadow effects.

2. The method of claim 1, wherein the line radiation source comprises an assemblage of parallel line radiation sources in a fixed array.

3. The method of claim 1, wherein the different locations are achieved by moving the line radiation source along a direction perpendicular to a length of the line radiation source.

4. The method of claim 3, where the moving of the line radiation source is conducted monotonically.

5. The method of claim 1, wherein the different locations are achieved by moving the line radiation source along a direction parallel to a length of the line radiation source.

6. The method of claim 5, where the moving of the line radiation source is conducted monotonically.

7. The method of claim 1, further comprising orienting the line radiation source to a second orientation that is perpendicular to the first orientation, and obtaining a plurality of a line images, where each line image is taken at a different location of the line radiation source with respect to the septa collimator; wherein each different location of the line radiation source is along a second linear direction that is perpendicular to the first linear direction.

8. The method of claim 7, where the first orientation is horizontal.

9. The method of claim 8, where the second orientation is vertical.

10. The method of claim 1, where the collimator is a septa collimator whose walls are effectively thick enough to absorb photons that impinge upon it.

11. A system for removing septal shadows from a septa collimator, comprising:
  a detector;
  a controllably movable stage;
  a line radiation source positioned at a distance from the detector, wherein the line radiation source is mounted on the controllably movable stage;
  a collimator positioned between the detector and the line radiation source; where the collimator moves in unison with the detector;
  a control unit for controlling the movable stage, said control unit comprising a machine-readable memory unit for storing a set of instructions for relocating a plurality of images to a common location and summing up the images; and
  a processor unit for executing the set of instructions, wherein when said processor executes said set of instructions, the control unit performs a method comprising:
    disposing a line radiation source in a first orientation with respect to an imaging detector;
    disposing a septa collimator between the line radiation source and the imaging detector;
    obtaining a plurality of a line images, where each line image is taken at a different location of the line radiation source with respect to the septa collimator; wherein each different location of the line radiation source is along a first linear direction; and
    relocating the plurality of the line images so obtained to a common location; and summing the images to reduce the septal shadow effects.

12. The system of claim 11, where the line radiation source comprises a plurality of line radiation sources.

* * * * *